United States Patent
Straub

(10) Patent No.: US 8,402,940 B2
(45) Date of Patent: Mar. 26, 2013

(54) ENGINE HAVING FUEL INJECTION INDUCED COMBUSTION CHAMBER MIXING

(75) Inventor: Robert D. Straub, Lowell, MI (US)

(73) Assignee: GM Global Technology Operations LLC

( * ) Notice: Subject to any disclaimer, the term of this patent is extended or adjusted under 35 U.S.C. 154(b) by 504 days.

(21) Appl. No.: 12/752,235

(22) Filed: Apr. 1, 2010

(65) Prior Publication Data

US 2011/0239982 A1    Oct. 6, 2011

(51) Int. Cl.
*F02B 31/00*    (2006.01)
*F02B 5/00*    (2006.01)

(52) U.S. Cl. ........................................ 123/301; 123/305

(58) Field of Classification Search .................. 123/250, 123/261, 298, 301, 305
See application file for complete search history.

(56) References Cited

U.S. PATENT DOCUMENTS

| | | | | |
|---|---|---|---|---|
| 2,100,143 A | | 11/1937 | Mock | |
| 2,411,740 A | * | 11/1946 | Malin | 123/295 |
| 2,412,821 A | * | 12/1946 | Malin et al. | 123/295 |
| 2,431,857 A | * | 12/1947 | Fenney | 123/301 |
| 2,484,009 A | * | 10/1949 | Barber | 123/295 |
| 2,741,230 A | * | 4/1956 | Reynolds | 123/304 |
| 2,744,506 A | * | 5/1956 | Reynolds | 123/301 |
| 2,758,578 A | * | 8/1956 | Hopkins | 123/301 |
| 2,767,692 A | * | 10/1956 | Barber | 123/301 |
| 2,864,347 A | * | 12/1958 | Davis et al. | 123/301 |
| RE24,851 E | * | 8/1960 | Buchi | 123/276 |
| 2,958,314 A | * | 11/1960 | Mitchell | 123/301 |
| 2,977,942 A | * | 4/1961 | Reynolds | 123/301 |
| 3,809,027 A | * | 5/1974 | Morgan | 123/251 |
| 4,401,071 A | * | 8/1983 | Zurner et al. | 123/276 |
| 4,476,821 A | * | 10/1984 | Robinson et al. | 123/68 |
| 4,526,143 A | * | 7/1985 | Oshima et al. | 123/301 |
| 4,641,617 A | * | 2/1987 | Aoyama et al. | 123/262 |
| 4,685,432 A | * | 8/1987 | Saito et al. | 123/276 |
| 4,858,579 A | * | 8/1989 | Elsbett et al. | 123/299 |
| 4,872,433 A | * | 10/1989 | Paul et al. | 123/257 |
| 4,924,828 A | | 5/1990 | Oppenheim | |
| 5,042,441 A | * | 8/1991 | Paul et al. | 123/276 |
| 5,345,906 A | * | 9/1994 | Luczak | 123/299 |
| 5,605,127 A | * | 2/1997 | Yoshihara et al. | 123/299 |
| 5,735,240 A | * | 4/1998 | Ito et al. | 123/295 |
| 6,267,096 B1 | * | 7/2001 | Vallance et al. | 123/301 |
| 6,418,885 B1 | * | 7/2002 | Paul et al. | 123/25 C |
| 6,883,491 B2 | * | 4/2005 | Arndt et al. | 123/305 |
| 2004/0020459 A1 | * | 2/2004 | Arndt et al. | 123/305 |
| 2011/0067671 A1 | * | 3/2011 | Laimboeck | 123/298 |

FOREIGN PATENT DOCUMENTS

GB    651526 A    4/1951

* cited by examiner

*Primary Examiner* — Thomas Moulis

(74) *Attorney, Agent, or Firm* — Harness, Dickey & Pierce, P.L.C.

(57) ABSTRACT

An engine assembly may include an engine structure, a piston, and a direct injection fuel system. The engine structure may define a cylinder bore and the piston may be disposed within the cylinder bore for reciprocal displacement between a top dead center position and a bottom dead center position. The direct injection fuel system may include a fuel injector that provides a fuel spray to a combustion chamber defined by the piston and the cylinder bore. The fuel flow may extend generally tangential to a circumference of the combustion chamber and may define a centerline extending in a direction radially across the combustion chamber.

18 Claims, 10 Drawing Sheets

ENGINE HAVING FUEL INJECTION INDUCED COMBUSTION CHAMBER MIXING

FIELD

The present disclosure relates to internal combustion engines including direct injection fuel systems.

BACKGROUND

This section provides background information related to the present disclosure which is not necessarily prior art.

Engine assemblies may include direct engine fuel systems providing a fuel supply directly to a combustion chamber of the engine. Typically, the direct injection fuel systems may include a centrally located fuel injector. During the injection, the fuel injector may provide multiple radial fuel jets directed toward the combustion chamber walls. The orientation of the fuel injector and the resulting fuel flow may result in the fuel impacting the combustion chamber walls and therefore limiting mixing within the combustion chamber.

SUMMARY

An engine assembly may include an engine structure, a piston, and a direct injection fuel system. The engine structure may define a cylinder bore and the piston may be disposed within the cylinder bore for reciprocal displacement between a top dead center position and a bottom dead center position. The direct injection fuel system may include a fuel injector that provides a fuel spray to a combustion chamber defined by the piston and the engine structure. The fuel flow may extend generally tangential to a circumference of the combustion chamber and may define a centerline extending in a direction radially across the combustion chamber.

A method may include providing a direct injection fuel injector in communication with a combustion chamber of an internal combustion engine defined by an engine structure and a piston disposed in a cylinder bore defined by the engine structure. The method may further include injecting an air entraining fuel spray from the fuel injector directly into the combustion chamber generally tangential to a circumferential sidewall of the combustion chamber. A rotational flow of the fuel spray and the remaining air within the combustion chamber may be generated by the tangential fuel injection.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
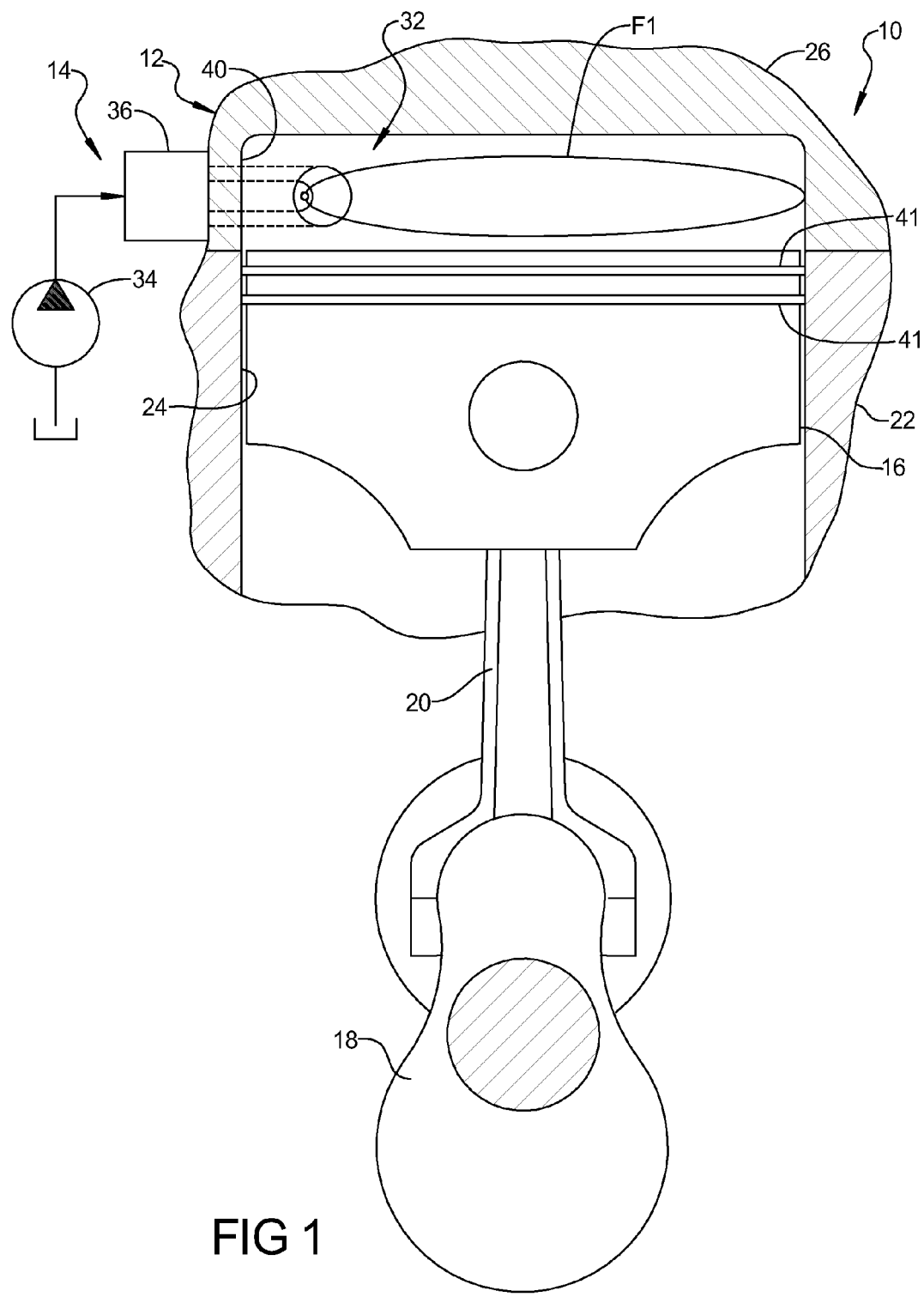
FIG. 1 is a schematic section view of an engine assembly according to the present disclosure.
Figure 2:
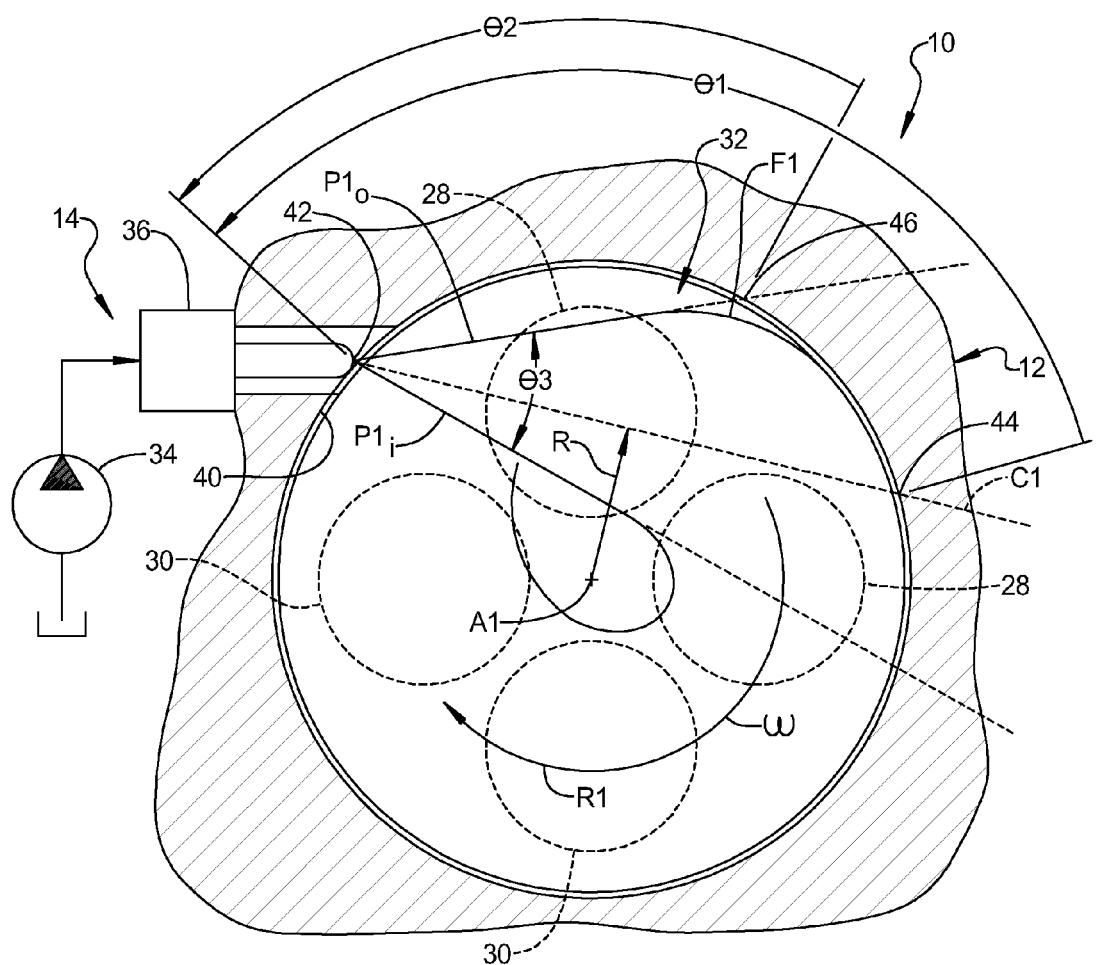
FIG. 2 is an additional schematic section view of the engine assembly of FIG. 1.

With reference to FIGS. 1 and 2, an engine assembly 10 may include an engine structure 12, a fuel system 14 and a piston 16 coupled to a crankshaft 18 by a connecting rod 20. The engine structure 12 may include an engine block 22 defining a cylinder bore 24 and a cylinder head 26 defining intake and exhaust ports 28, 30. The piston 16 may be disposed within the cylinder bore 24 and may be reciprocally displaceable between a top dead center (TDC) position and a bottom dead center (BDC) position to drive rotation of the crankshaft 18. The present disclosure applies equally to engines including any number of piston/cylinder arrangements, including opposed piston configurations (FIG. 12), as well as overhead cam and cam in block arrangements. The present disclosure also applies equally to diesel and direct injection gasoline engines.

The piston 16 and the engine structure 12 cooperate to define a combustion chamber 32. The pistons 16 may have seal rings 41 engaged with an outer circumference thereof and with the engine structure 12 to isolate the combustion chamber 32 from the engine crankcase. The combustion chamber 32 may include a round cross-section defining a circumference of the combustion chamber 32. The fuel system 14 may include a fuel pump 34 providing a pressurized fuel supply to a fuel injector 36. In the present non-limiting example, the fuel provided to the fuel injector 36 may be at an operating pressure of at least one hundred and twenty mega Pascal (120 MPa), and more specifically greater than two hundred mega Pascal (200 MPa) during high load operation. The fuel system 14 may be operated at reduced pressures at low and part load operation of the engine. The fuel injector 36 is in direct communication with the combustion chamber 32 forming a direct injection arrangement. The fuel injector 36 may be incorporated into a fuel rail (not shown) having a plurality of fuel injectors.

The fuel injector 36 may extend through a sidewall 40 of the combustion chamber 32 and provide a fuel spray (F1) extending radially into the combustion chamber 32. The fuel spray (F1) may be in the form of a finely atomized spray. The fuel spray (F1) may be located axially above the seal rings 41 of the piston 16 when the piston 16 is in the TDC position. In the present non-limiting example, the fuel spray (F1) may extend generally tangential to the sidewall (circumference) 40 of the combustion chamber 32. More specifically, the fuel spray (F1) may define a fuel spray pattern including centerline (C1) between inner and outer radial peripheries ($P1_i$, $P1_o$). The centerline (C1) may extend in a direction across the combustion chamber 32 from a circumferential starting point 42 to a first circumferential ending point 44 where the centerline (C1) intersects the cylinder bore 24. The first circumferential ending point 44 may be circumferentially spaced (rotationally offset) from the circumferential starting point 42 by an angle ($\theta 1$) of less than or equal to one hundred and thirty-five degrees. The outer radial periphery ($P1_o$) may extend in a direction intersecting the cylinder bore 24 at a second circumferential ending point 46 circumferentially spaced (rotationally offset) from the circumferential starting point 42 by an angle ($\theta 2$) of less than or equal to ninety degrees. The fuel spray (F1) may define an angular span ($\theta 3$) of less than or equal to thirty degrees.

Figure 7:
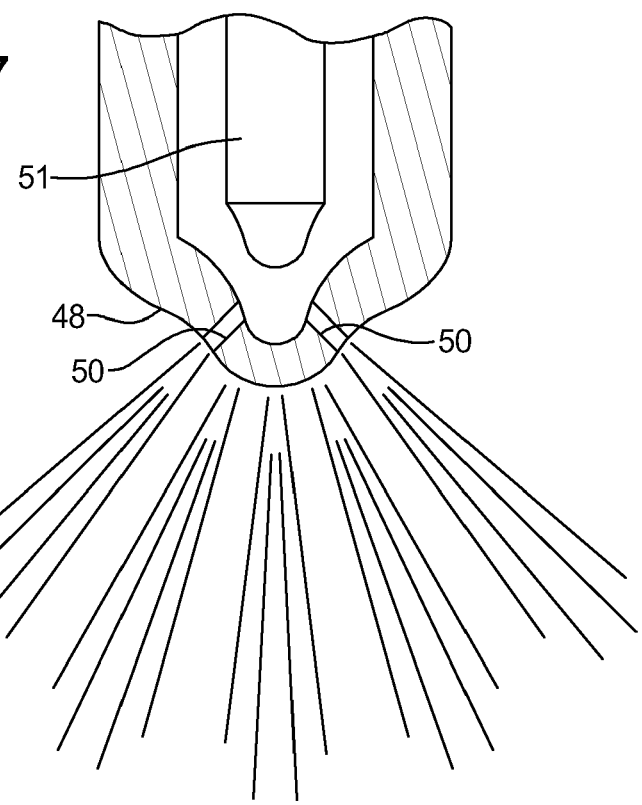
FIG. 7 is a schematic illustration of a first fuel injector nozzle according to the present disclosure.
Figure 8:
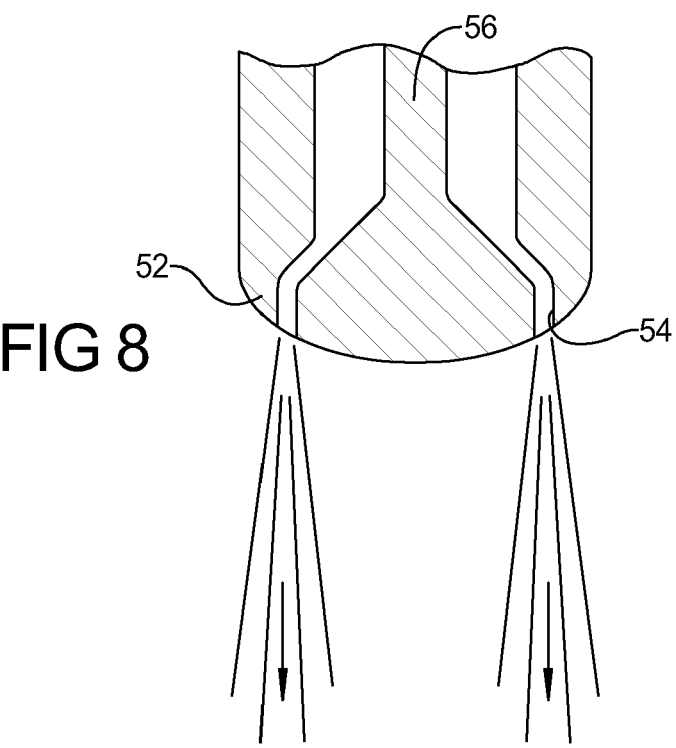
FIG. 8 is a schematic illustration of a second fuel injector nozzle according to the present disclosure.
Figure 9:
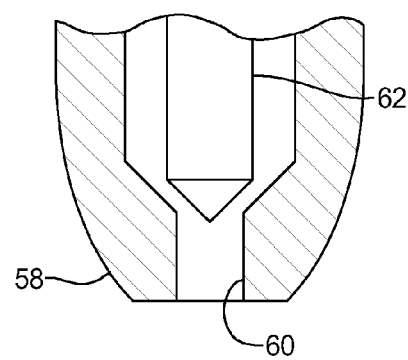
FIG. 9 is a schematic illustration of a third fuel injector nozzle according to the present disclosure.

The fuel spray (F1) may include multiple plumes. The multiple plumes may be generated by a nozzle 48 of the fuel injector 36 defining a plurality of apertures 50 selectively opened by a pintle valve 51 as illustrated in FIG. 7. However, it is understood that the fuel spray (F1) may alternatively include a single plume. The single plume may be generated by a nozzle 52 of the fuel injector 36 defining a single opening 54 and a poppet valve 56 as illustrated in FIG. 8. Alternatively, as seen in FIG. 9, a nozzle 58 defining a single opening 60 may be used with a pintle valve 62 to form a single annular plume. In any of the arrangements, the high operating pressure of the pressurized fuel supply and the orientation of the fuel spray (F1) relative to the combustion chamber 32 may create a rotational swirl spray within the combustion chamber 32 and provide mixing.

As the fuel injection proceeds, rotation of the air within the combustion chamber provides a flow of air to the spray from the injector which contains neither fuel nor combustion products from the injection event. The gas within the combustion chamber herein described as "air" may include recirculated exhaust products from previous combustion cycles. The fuel spray (F1) may travel in a rotational direction (R1) about a rotational axis (A1) generally parallel to the direction of reciprocation of the piston 16. The momentum of the fuel spray (F1) within the combustion chamber 32 may provide mixing of the air charge and fuel within the combustion chamber 32 and generate rotational flow of the fuel spray (F1) and air charge mixture (fuel-air charge). More specifically, the momentum of the fuel spray (F1) may be sufficient to provide for a complete rotation of the fuel-air charge around the combustion chamber 32 during an injection event for a corresponding combustion event (in-cylinder combustion corresponding to a power stroke). The fuel delivered to the combustion chamber 32 at the start of the injection event (initial injection) may travel at least three hundred and sixty degrees about the rotational axis (A1), returning to the injection location by the end of the injection event (injection termination). The time from the start of the injection event to the end of the injection event may define a fuel injection period.

Figure 10:
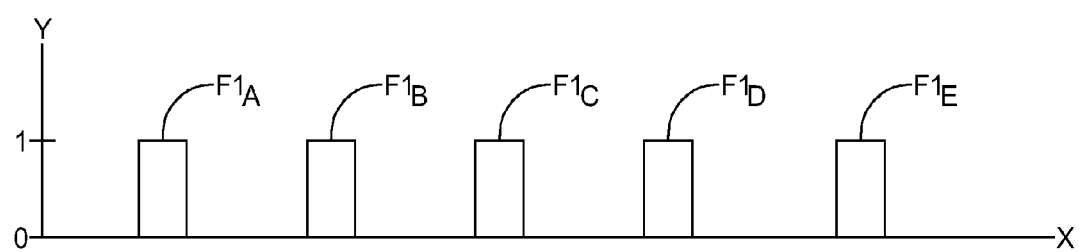
FIG. 10 is a graphical illustration of an alternate injection arrangement according to the present disclosure.
Figure 11:
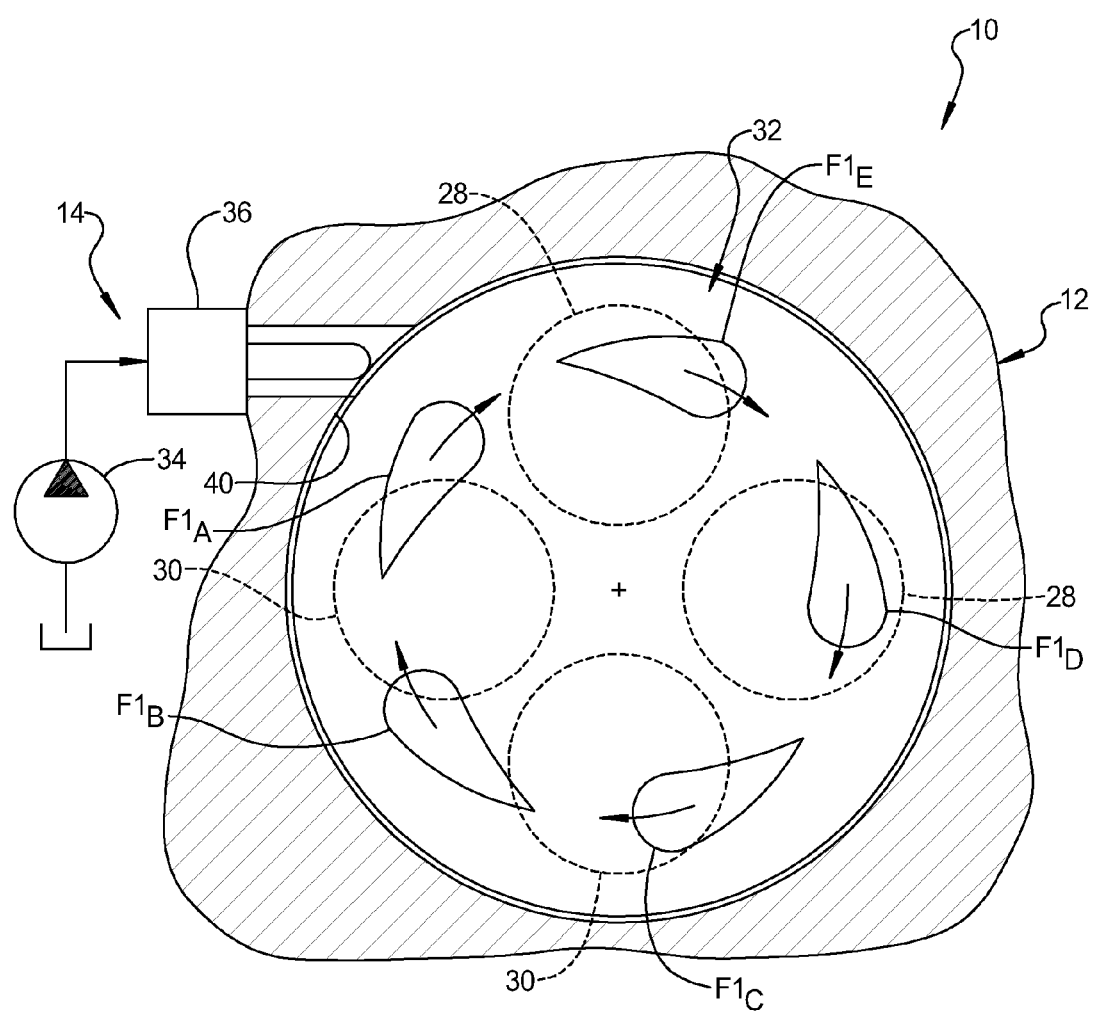
FIG. 11 is a schematic illustration of an engine assembly including the injection arrangement of FIG. 10.

With reference to FIGS. 10 and 11, in modes of operation such as part load operation, where insufficient momentum may exist in the fuel spray to rotate the cylinder fuel-air charge three hundred and sixty degrees during an injection event, the injection of the fuel may be done in multiple events ($F1_A$, $F1_B$, $F1_C$, $F1_D$, $F1_E$) over an extended period of time to distribute the fuel more uniformly in the combustion chamber 32. FIG. 10 graphically illustrates the multiple injections. The x-axis in FIG. 10 is time (t) and the y-axis is injector opening, where "0" is closed and "1" is open.

By way of non-limiting example, the fuel spray (F1) may contain a linear momentum (M) which is approximately directly proportional to the injection pressure level and the duration of the injection. The combustion chamber fuel-air charge at the end of the injection event has a final rotational velocity ($\omega$) approximated by the product of spray momentum (M) and its tangential distance (R) to the center of the combustion chamber 32 divided by the moment of inertia (I) of the combustion chamber gas. The final rotational velocity ($\omega$) would be further increased by any initial rotating velocity, or swirl, ($\omega_o$) of the fuel-air charge that existed in the combustion chamber prior to the injection event.

Figure 3:
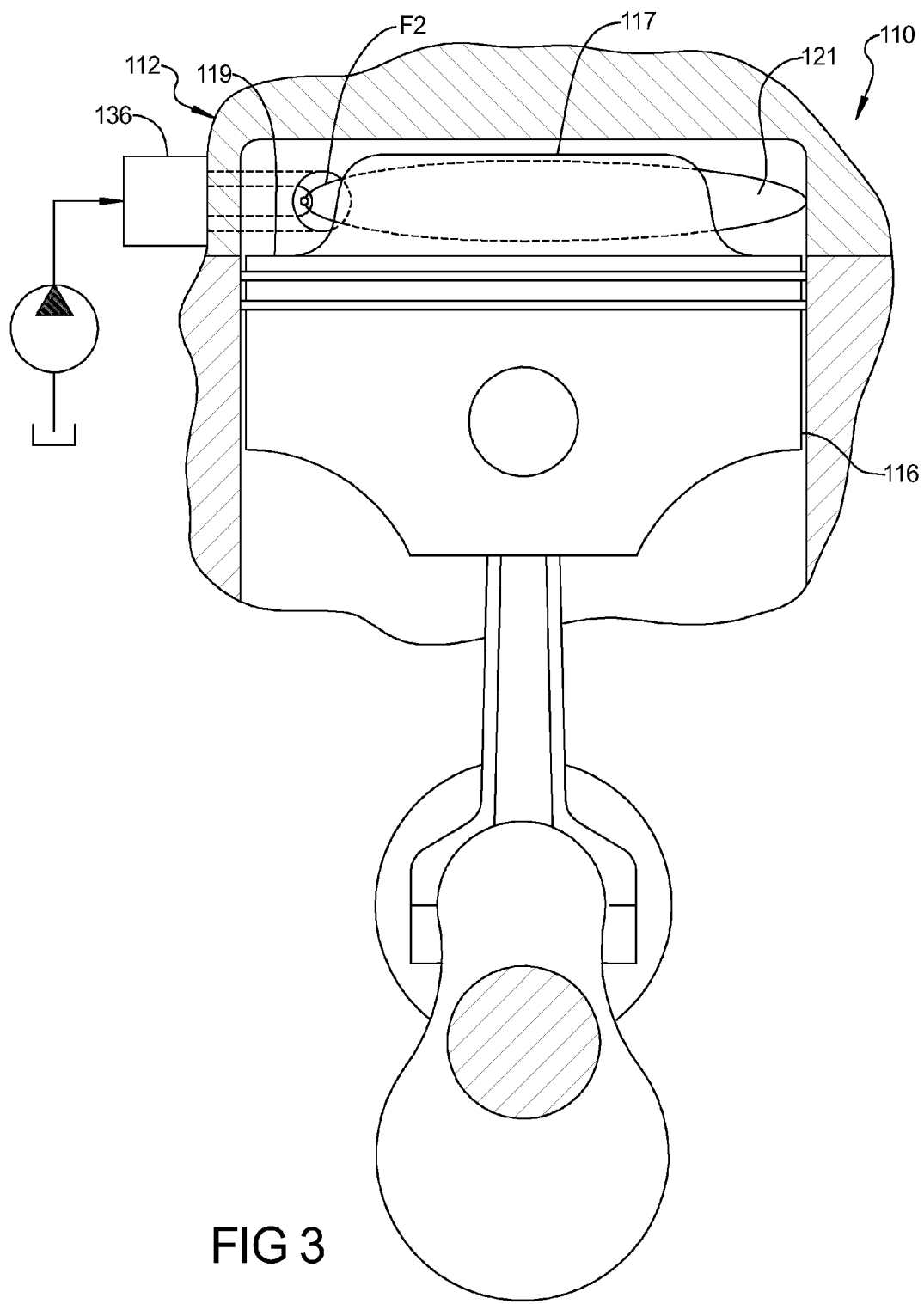
FIG. 3 is a schematic section view of an alternate engine assembly according to the present disclosure.
Figure 4:
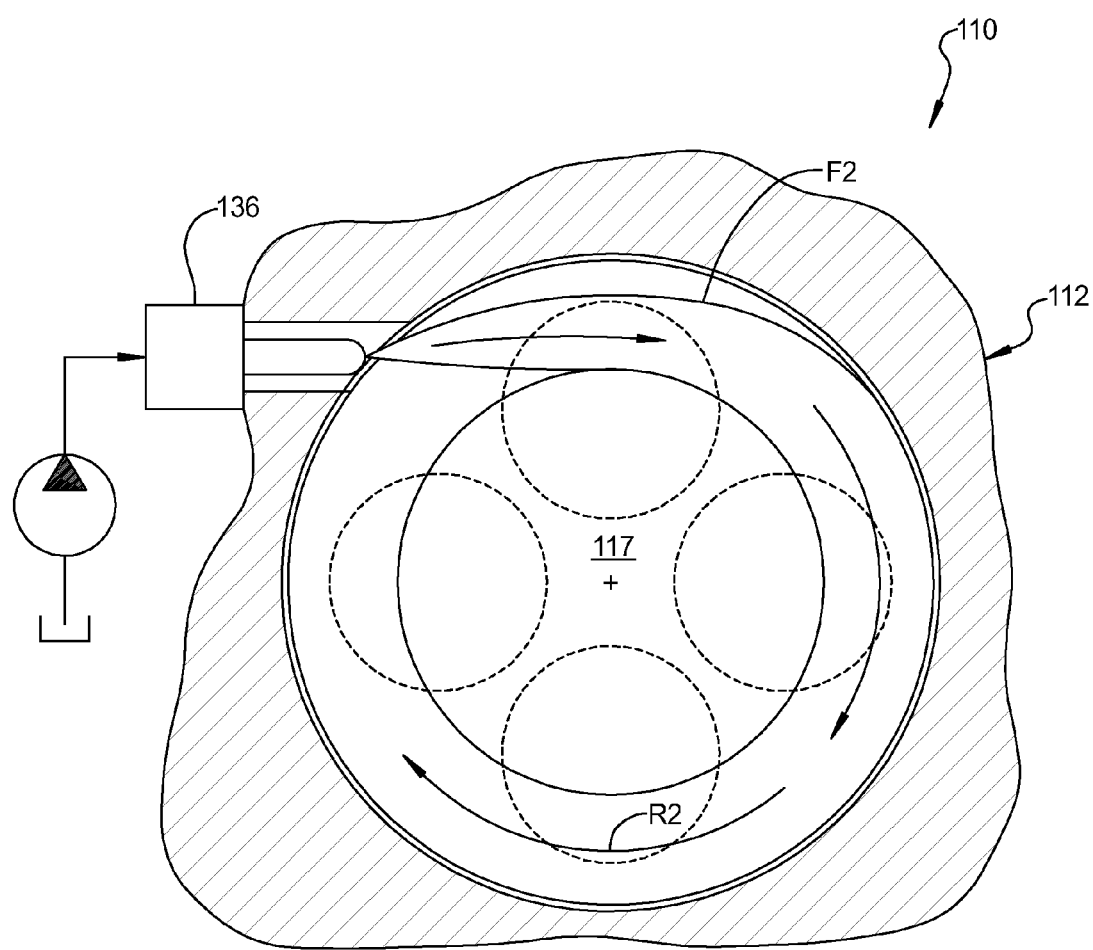
FIG. 4 is an additional schematic section view of the engine assembly of FIG. 3.

An alternate engine assembly 110 is illustrated in FIGS. 3 and 4. The engine assembly 110 may be generally similar to the engine assembly 10. Therefore, for simplicity, the engine assembly 110 will not be described in detail with the understanding that the description of the engine assembly 10 applies equally with the exceptions noted below.

The piston 116 in the engine assembly 110 may include a central domed region 117 extending from an annular axial end surface 119 of the piston 116 surrounding the central domed region 117. The fuel injector 136 may direct the fuel spray (F2) into an annular channel 121 defined radially between the central domed region 117 and the engine structure 112. The annular channel 121 may assist in defining the rotational direction (R2) of the fuel spray (F2). The fuel spray (F2) may be in the form of a single plume (e.g., nozzle 52 and poppet valve 56 of FIG. 8 or nozzle 58 and pintle valve 62 of FIG. 9). However, as discussed above regarding the engine assembly 10, the fuel spray (F2) may alternatively include multiple plumes (e.g., nozzle 48 and apertures 50 of FIG. 7).

The momentum and spray characteristics of the fuel spray (F2) may be similar to those described above regarding the fuel spray (F1) and therefore are not described in detail.

Figure 5:
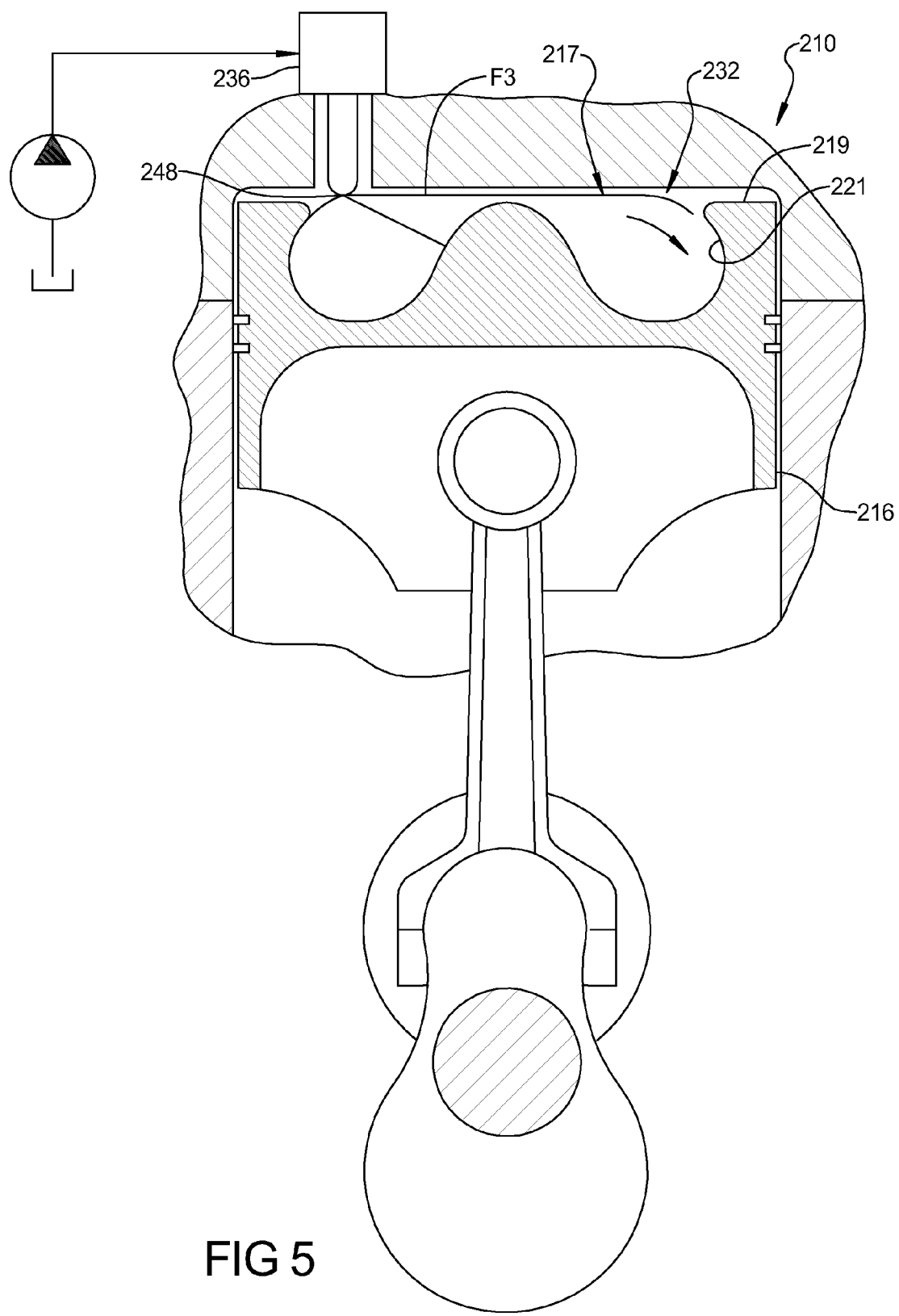
FIG. 5 is a schematic section view of an alternate engine assembly according to the present disclosure.
Figure 6:
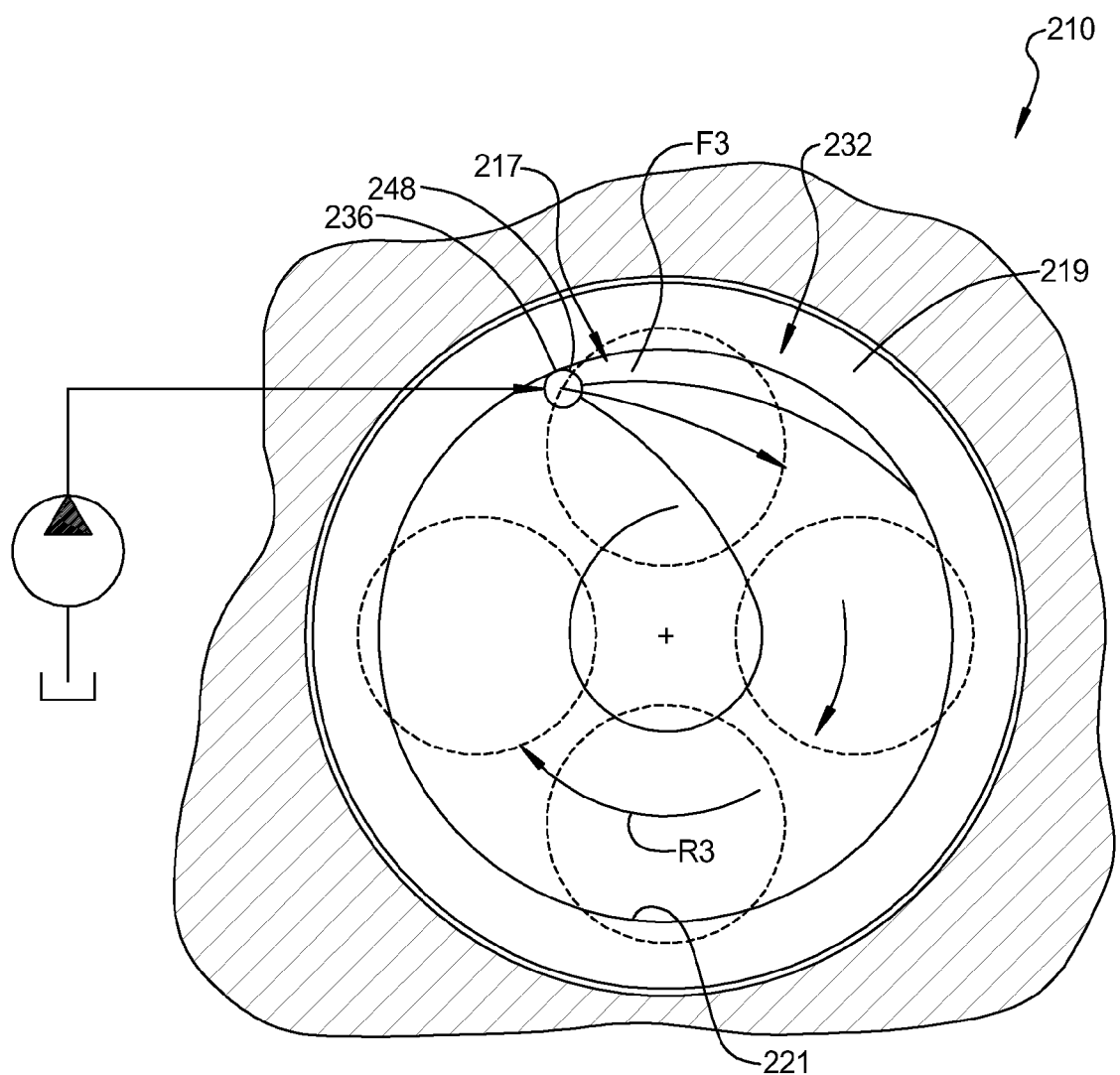
FIG. 6 is an additional schematic section view of the engine assembly of FIG. 5.

An alternate engine assembly 210 is illustrated in FIGS. 5 and 6. The engine assembly 210 may be generally similar to the engine assembly 10. Therefore, for simplicity, the engine assembly 210 will not be described in detail with the understanding that the description of the engine assembly 10 applies equally with the exceptions noted below. The engine assembly 210 may include a modified orientation of the fuel injector 236 and a modified geometry of the piston 216.

More specifically, the fuel injector 236 may extend axially into the combustion chamber 232. The piston 216 may define a torroidal combustion bowl 217 in an axial end 219 facing the fuel injector 236. The torroidal combustion bowl 217 may include an annular recess 221. The fuel injector 236 may be radially aligned with the annular recess 221 and may direct fuel spray (F3) into the annular recess 221.

The annular recess 221 may assist in defining the rotational direction (R3) of the fuel spray (F3). The momentum and spray characteristics of the fuel spray (F3) may be similar to those described above regarding the fuel spray (F1) and therefore are not described in detail. Further, due to the axial orientation of the fuel injector 236, the nozzle 248 may define a radial discharge path to generate the rotational swirl spray pattern within the annular recess 221.

Figure 12:
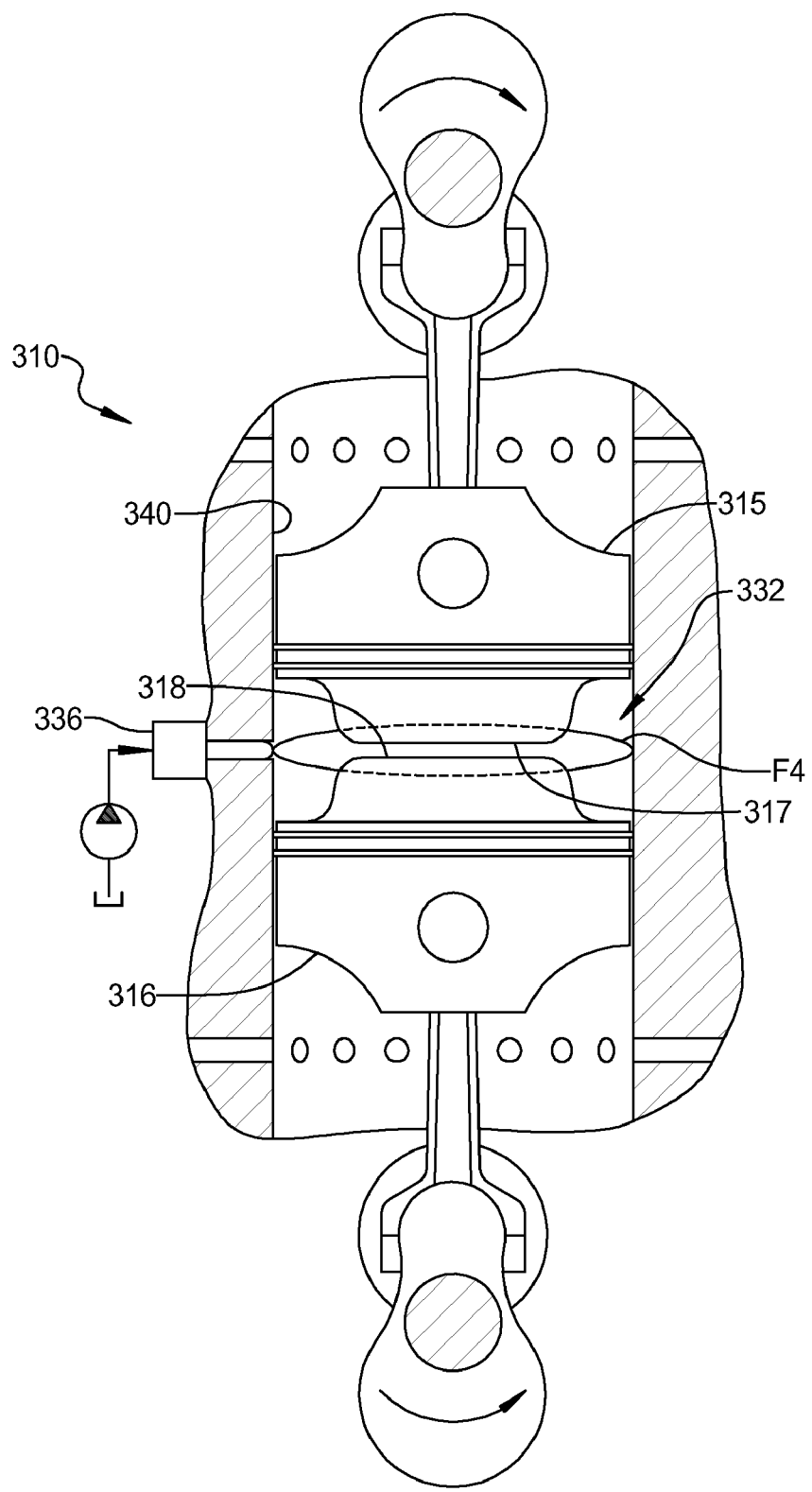
FIG. 12 is a schematic illustration of an alternate engine assembly according to the present disclosure.

FIG. 12 illustrates an engine assembly 310 including opposed pistons 315, 316. The engine assembly 310 may be generally similar to the engine assembly 110 shown in FIGS. 3 and 4. However, the fuel injector 336 may extend through a sidewall 340 of the combustion chamber 332 at a location axially centered between the opposed pistons 315, 316. The fuel injector 336 may provide a fuel spray (F4) radially into the combustion chamber 332 and tangential to the sidewall 340 of the combustion chamber 332. The pistons 315, 316 may each define a central dome region 317, 318 to provide an annular flow path for the fuel spray (F4).

What is claimed is:

1. An engine assembly comprising:
    an engine structure defining a cylinder bore;
    a piston disposed within the cylinder bore for reciprocal displacement between a top dead center position and a bottom dead center position; and
    a direct injection fuel system including only a single fuel injector that provides a fuel spray to a combustion chamber defined by the piston and the cylinder bore, the fuel spray extending generally tangential to a circumference of the combustion chamber and defining a centerline extending in a direction radially across the combustion chamber;
    wherein the fuel injector is in fluid communication with a pressurized fuel supply at an operating pressure of at least 120 mega Pascal (MPa).

2. The engine assembly of claim 1, wherein the centerline of the fuel spray extends in a direction from a circumferential starting point on the circumference of the combustion chamber to a first circumferential ending point on the circumference of the combustion chamber, the first circumferential ending point being rotationally offset in a rotational direction from the circumferential starting point by less than or equal to 135 degrees along the circumference.

3. The engine assembly of claim 2, wherein the fuel spray includes a spray pattern defining an inner and outer radial periphery extending around the centerline, the outer radial periphery extending in a direction from the circumferential starting point to a second circumferential ending point on the circumference of the combustion chamber, the second circumferential ending point being rotationally offset in the rotational direction from the circumferential starting point by less than or equal to 90 degrees along the circumference.

4. The engine assembly of claim 3, wherein the fuel spray defines an angular span of less than or equal to 30 degrees.

5. The engine assembly of claim 1, wherein the fuel injector is located in an opening extending through a sidewall of the combustion chamber defining the circumference of the combustion chamber.

6. The engine assembly of claim 5, wherein the piston includes a central domed region extending axially outward relative to an annular axial end surface of the piston surrounding the central domed region.

7. The engine assembly of claim 6, wherein the piston includes a seal ring engaged with an outer circumference of the piston and the circumference of the combustion chamber, the fuel spray being located axially outward from the seal ring when the piston is in the top dead center position.

8. The engine assembly of claim 1, wherein the fuel injector is located in an opening extending through an axial end of the combustion chamber.

9. The engine assembly of claim 8, wherein the piston defines an annular recess extending axially into an end surface of the piston and radially aligned with the fuel injector.

10. A method comprising:
    providing only a single direct injection fuel injector in communication with a combustion chamber of an internal combustion engine defined by a cylinder bore in an engine structure and a piston disposed in the cylinder bore;
    injecting a fuel spray from the single fuel injector directly into the combustion chamber generally tangential to a circumferential sidewall of the combustion chamber; and
    generating rotational flow of the fuel spray and an air charge within the combustion chamber from the injecting;
    wherein the injecting includes providing a fuel spray to the fuel injector at an operating pressure of at least 120 mega Pascal (MPa).

11. The method of claim 10, wherein the injecting defines a fuel injection period including an injection beginning and an injection termination for a combustion event, the generating including fuel spray from the injection beginning travelling approximately 360 degrees around the combustion chamber by the injection termination.

12. The method of claim 10, wherein the injecting provides fuel to the combustion chamber from a circumferential starting point relative to the circumferential sidewall of the combustion chamber, the generating including a fuel spray provided at an initial injection travelling rotationally around the combustion chamber to the starting location during the injecting.

13. The method of claim 10, wherein the generating includes a centerline of the fuel spray extending in a direction from a circumferential starting point on the circumference of the combustion chamber to a first circumferential ending point on the circumference of the combustion chamber, the first circumferential ending point being rotationally offset in a rotational direction of the rotational spray from the circumferential starting point by less than or equal to 135 degrees along the circumference.

14. The method of claim 13, wherein the fuel spray includes an outer radial periphery extending in a direction from the circumferential starting point to a second circumferential ending point on the circumference of the combustion chamber, the second circumferential ending point being rotationally offset in the rotational direction from the circumferential starting point by less than or equal to 90 degrees along the circumference.

15. The method of claim 14, wherein the fuel spray defines an angular span of less than or equal to 30 degrees.

16. The method of claim 10, wherein the fuel injector is located in an opening extending through a sidewall of the combustion chamber defining the circumference of the combustion chamber.

17. The method of claim 16, wherein the piston includes a central domed region extending axially outward relative to an annular axial end surface of the piston surrounding the central domed region and a seal ring engaged with an outer circumference of the piston and the circumference of the combustion chamber, the injecting including fuel spray being located axially outward from the seal ring when the piston is in a top dead center position.

18. The method of claim 10, wherein the fuel injector is located in an opening extending through an axial end of the combustion chamber and the piston defines an annular recess extending axially into an end surface of the piston and radially aligned with the fuel injector, the injecting including directing the fuel spray into the annular recess.

* * * * *